United States Patent
Chopping et al.

(10) Patent No.: US 7,444,431 B2
(45) Date of Patent: *Oct. 28, 2008

(54) PARTIALLY INTERCONNECTED NETWORKS

(75) Inventors: Geoffrey Chopping, Wimborne (GB); Richard John Proctor, Wimborne (GB)

(73) Assignee: Ericsson AB, Stockholm (SE)

( * ) Notice: Subject to any disclaimer, the term of this patent is extended or adjusted under 35 U.S.C. 154(b) by 275 days.

This patent is subject to a terminal disclaimer.

(21) Appl. No.: 10/470,205

(22) PCT Filed: Jan. 14, 2002

(86) PCT No.: PCT/GB02/00148

§ 371 (c)(1),
(2), (4) Date: Feb. 3, 2005

(87) PCT Pub. No.: WO02/062081

PCT Pub. Date: Aug. 8, 2002

(65) Prior Publication Data

US 2005/0160131 A1    Jul. 21, 2005

(30) Foreign Application Priority Data

Jan. 30, 2001    (GB)    ................................ 0102348.0

(51) Int. Cl.
*G06F 15/16* (2006.01)

(52) U.S. Cl. .................................................... 709/249

(58) Field of Classification Search ......... 709/249–252, 709/238–239; 370/400–408
See application file for complete search history.

(56) References Cited

U.S. PATENT DOCUMENTS 6,339,488 B1 * 1/2002 Beshai et al. ................. 398/59
6,542,511 B1 * 4/2003 Livermore et al. ........... 370/406
6,909,700 B1 * 6/2005 Benmohamed et al. ...... 370/255
2006/0153066 A1 * 7/2006 Saleh et al. .................. 370/216

FOREIGN PATENT DOCUMENTS

GB    2 350 517 A    11/2000

OTHER PUBLICATIONS

Seigneur, W.F., *The Robust Open Architecture Distributed Switching Model: Building the Network Operating System for the Information Superhighway*, 1996 Annual Review of Communications, vol. 49, pp. 637-651.

* cited by examiner

*Primary Examiner*—Salad Abdullahi
(74) *Attorney, Agent, or Firm*—Kirschstein, et al.

(57) ABSTRACT

A partially interconnected network comprises a plurality of allocated nodes, each allocated to one of a number of areas, a plurality of star nodes, and point-to-point interconnections between the allocated nodes and the star nodes. The number of areas with allocated nodes interconnected to an individual star node forms the number of routes from an individual star node, each of a proportion of the plurality of star nodes having connected thereat one of a group of point of presence (PoP) units. The group of PoP units is arranged to provide access to a selected service or selected services. The allocated nodes of a first of the areas are interconnected to a set comprising some, but not all, of the star nodes. Further of the areas are similarly interconnected to further sets each comprising star nodes. One, or more than one, of the direct point-to-point interconnections from each allocated node connects to one, or more than one, of the plurality of star nodes having connected thereat one of the group of PoP units. There is at least one interconnection choice between any two allocated nodes in different areas. An interconnection route comprises two point-to-point interconnections interconnected in series by a star node.

6 Claims, 5 Drawing Sheets

11 AREAs & 11 STARs

11 AREAs & 11 STARs

6 AREAs & 10 STARs

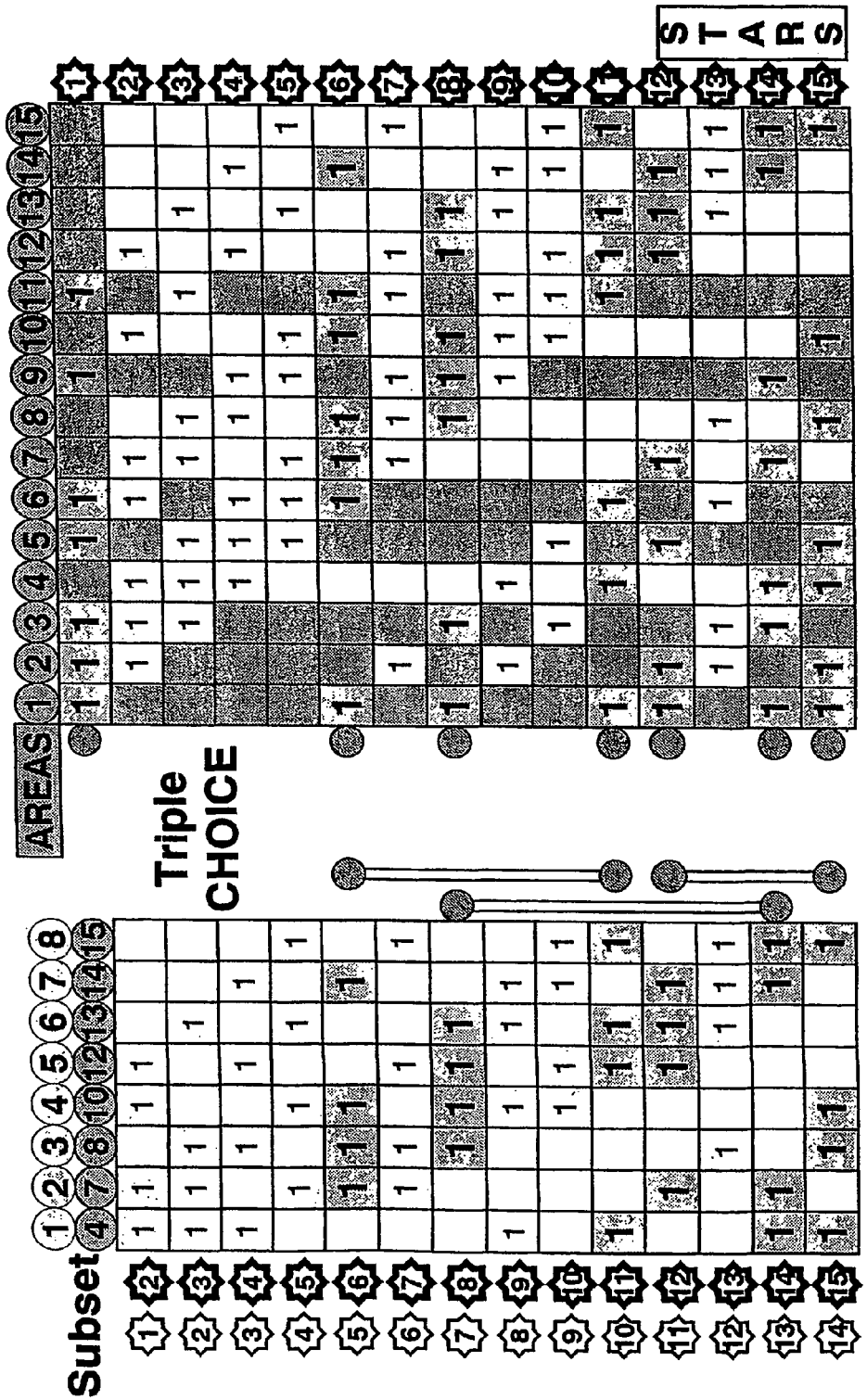

PARTIALLY INTERCONNECTED NETWORKS

The present invention relates to network topologies and in particular Partially Interconnected Network arrangements that are advantageous when connecting each main node to the other main nodes.

Reference is made to Patent Application No. GB2363544A and Patent No. GB2350517B, which are imported herein by reference.

In Patent Application No. GB2363544A there is described a partially interconnected topological network which has at least six Topological Nodes, each Topological Node having at least three point-to-point Topological Links connecting it to some but not all of the Topological Nodes, there being at least one Choice of routing between any two Topological Nodes and a Choice of routing is either via two point-to-point Topological Links connected in series at another Topological Node or a direct point-to-point Topological Link between the two Topological Nodes. The topological network is arranged by the application of symmetric Balanced Incomplete Block Designs or the application of Strongly Regular Graphs.

In Patent No. GB2350517B there is described a partially interconnected network comprising a plurality of Allocated Nodes, which Allocated Nodes are each allocated to one of a number of AREAS, and further comprising a plurality of STAR Nodes (STARs), and also comprising point to point interconnections between the Allocated Nodes and the STAR Nodes, where the number of AREAs with Allocated Nodes connected to an individual STAR forms the number of ROUTEs from an individual STAR, the Allocated Nodes of a first of the AREAs being connected to a set comprising some, but not all, of the STAR Nodes, and wherein further of the AREAs are similarly connected to further sets each comprising STAR Nodes and where there is at least one connection choice (CHOICE) between any two Allocated Nodes in different AREAs and where a connection route comprises two point to point interconnections connected in series by a STAR Node.

Reference is further made to the simultaneously filed application, Patent Application No. GB0102394.8 in which is described a partially interconnected network which has a plurality of Topological Nodes, each of the Topological Nodes having at least three direct point-to-point Topological Links connected to other Topological Nodes and each of a proportion of the plurality of Topological Nodes being connected to one of a group of Point-of Presence (PoP) Units. The group of PoP Units is arranged to provide access to a selected service or services, one or more of each at least three direct point-to-Point Topological Links from each Topological Node not being connected to one of a group of PoP Units connecting to one or more than one of the plurality of Topological Nodes being connected to one of the group of PoP Units. There is at least one Choice of routing between any two Topological Nodes, a Choice of routing being either via two Topological Links connected in series at another Topological Node or a direct point-to-point Topological Link between the two Topological Nodes.

According to the present invention there is provided a partially interconnected network comprising a plurality of Allocated Nodes, which Allocated Nodes are each allocated to one of a number of Areas (AREAs), and further comprising a plurality of Star Nodes (STARs), and comprising point to point interconnections between the Allocated Nodes and the Star Nodes, where the number of AREAs with Allocated Star Nodes interconnected to an individual Star forms the number of Routes (ROUTEs) from an individual STAR, each of a proportion of the plurality of Star Nodes having connected thereat one of a group of Point-of Presence (PoP) Units, said group of PoP Units arranged to provide access to a selected service, the Allocated Nodes of a first of the AREAs being interconnected to a set comprising some, but not all, of the STAR Nodes, and wherein further of the AREAs are similarly interconnected to further sets each comprising STAR Nodes, one or more than one of the direct point-to-Point interconnections from each Allocated Node connecting to one or more than one of the plurality of Star Nodes having connected thereat one of the group of PoP Units, and where there is at least one interconnection choice (CHOICE) between any two Allocated Nodes in different AREAs and where an interconnection route comprises two point to point interconnections interconnected in series by a STAR Node.

The use of Partially Interconnected Networks with AREAs and STARs as described in Patent No. GB2350517B may appear not to enable Point of Presence Units to be attached very efficiently, where a Point of Presence Unit could be an Internet Service Provider (ISP), a video source, a call centre, an International Network, an Interconnection Point, a further Network Interconnection Point, etc. any of which may be accessed with the help of Intelligent Network call control arrangements.

The object of the present invention is to describe means by which Point of Presence Units can be efficiently attached to regular Partially Interconnected Network in a regular manner to give equal access from allocated nodes within the AREAs to the Points of Presence Units attached to the STARs.

The present network is directed towards the connection of a network of "Points-of-Presence" (PoP). A PoP is a computer node used to connect, among other things, to the Internet. Many Internet Service Providers (ISPs) advertise 90% (or greater) local call coverage in the UK, which means that they have PoPs all around the country which can be accessed for the cost of a local telephone call.

For the present invention, the PoPs or Content Servers, may be ISPs, Video Servers, call centres, Intelligent Networks and similar features which it is intended should be readily accessed locally by subscribers.

According to the present invention there is provided a partially interconnected network comprising a plurality of Allocated Nodes, which Allocated Nodes are each allocated to one of a number of Areas (AREAs), and further comprising a plurality of Star Nodes (STARs), and comprising point-to-point interconnections between the Allocated Nodes and the Star Nodes, where the number of AREAs with Allocated Nodes interconnected to an individual Star forms the number of Routes (ROUTEs) from an individual STAR, each of a proportion of the plurality of Star Nodes having connected thereat one of a group of Point of Presence (PoP) Units, said group of PoP Units being arranged to provide access to a selected service or selected services, the Allocated Nodes of a first of the AREAs being interconnected to a set comprising some, but not all, of the STAR Nodes, and wherein further of the AREAs are similarly interconnected to further sets each comprising STAR Nodes, one, or more than one, of the direct point-to-point interconnections from each Allocated Node connecting to one, or more than one, of the plurality of Star Nodes having connected thereat one of the group of PoP Units, and where there is at least one interconnection choice (CHOICE) between any two Allocated Nodes in different AREAs and where an interconnection route comprises two point-to-point interconnections interconnected in series by a STAR Node.

The present invention will now be described by way of example, with reference to the accompanying drawings, in which:

FIG. 5a shows the connectivity table for a network of fifteen AREAs and fifteen STARS; and FIG. 5b shows the connectivity table of FIG. 5a when STAR 1 is removed.

FIG. 1 is a figure shown in GB Patent Application No: GB2350517, having eleven STARs and eleven AREAs.

Figure 1:
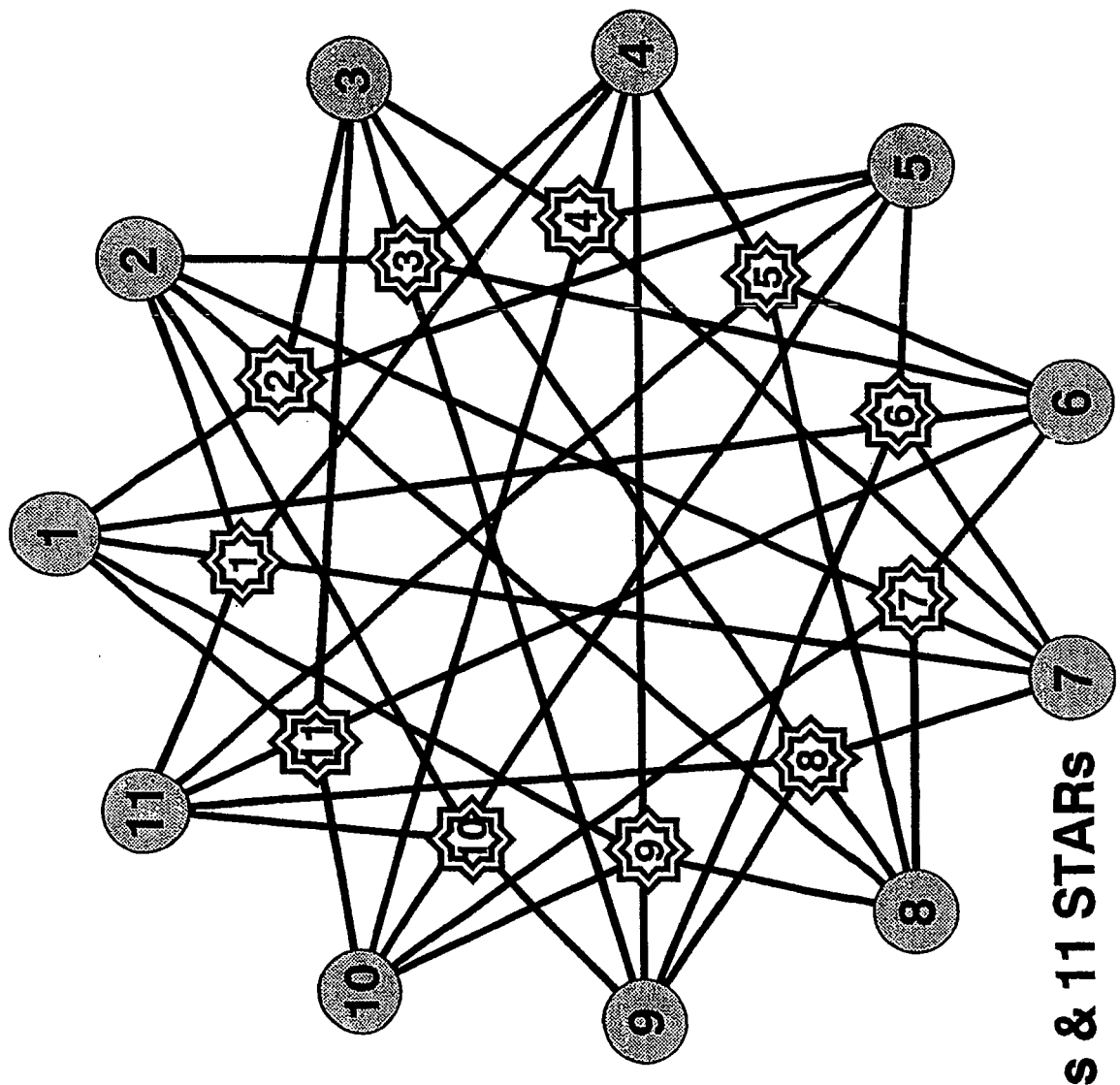
FIG. 1 shows a network having eleven AREAs and eleven STARs.
Figure 2:
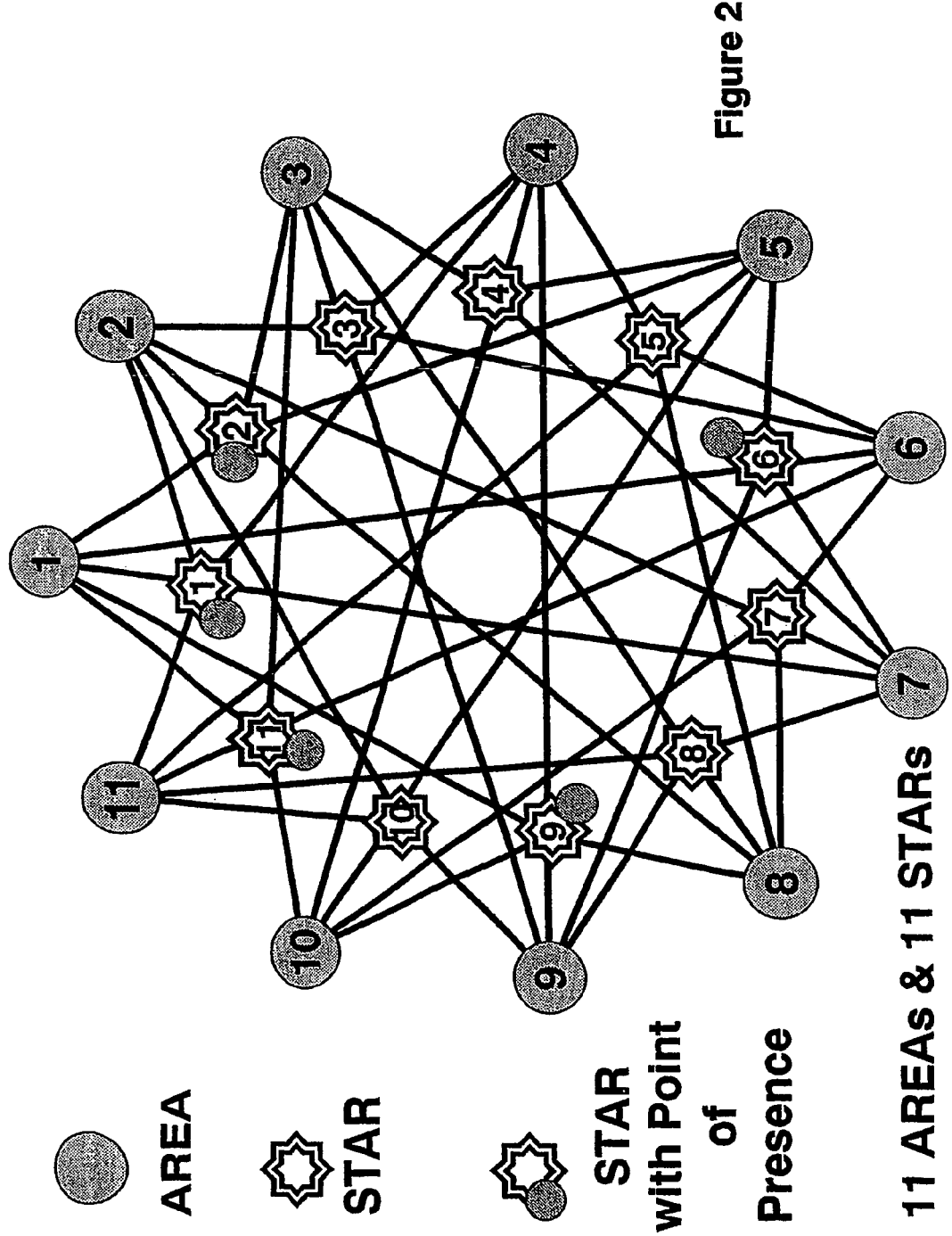
FIG. 2 shows the network of FIG. 1 having five PoPs.

FIG. 2 is derived from FIG. 1, but it has had added to it 5 Point-of-Presence (PoP) Units. In FIGS. 1 and 2a, each Area is connected to 5 STARs and each STAR is connected to 5 AREAs. In FIG. 2 one PoP Unit has been attached to each of STARs 1, 2, 6, 9 and 11. The 5 STARs with PoP Units are all directly connected to AREA 1.

Figures 3A, 3B:
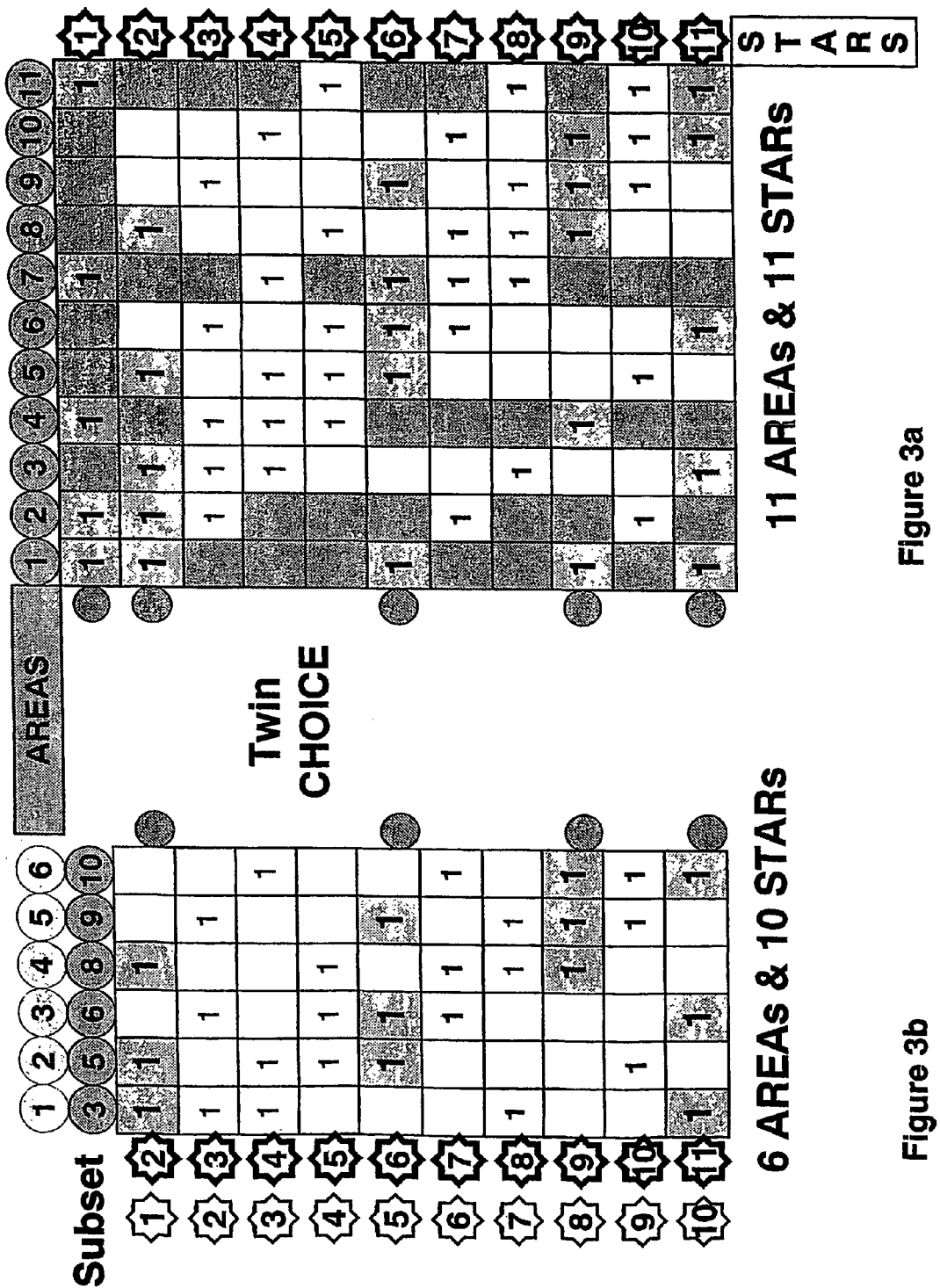
FIG. 3a shows the connectivity table for the network of FIG. 2.
FIG. 3b shows the connectivity table for the network of FIG. 2 when STAR 1 has been removed.

The corresponding connectivity table for FIG. 2 is shown in FIG. 3a. The connectivity is such that there are 2 CHOICEs for traversing from one AREA to another AREA via a STAR, or for traversing from an Allocated Node in one AREA to an Allocated Node in another AREA, as explained in Patent No: GB2350517B.

By attaching PoP Units at the 5 STARs it is possible to reach directly two PoP Units from an AREA, or from an Allocated Node within a AREA, except for AREA 1, which as already stated is directly connected to all 5 PoP Units in this example.

So by spreading the PoP Units across the STARs of a Regular Partially Interconnected Network with a uniform CHOICE, in the manner described, then a uniform number of PoP Units can be accessed from all AREAs bar one.

Figure 4:
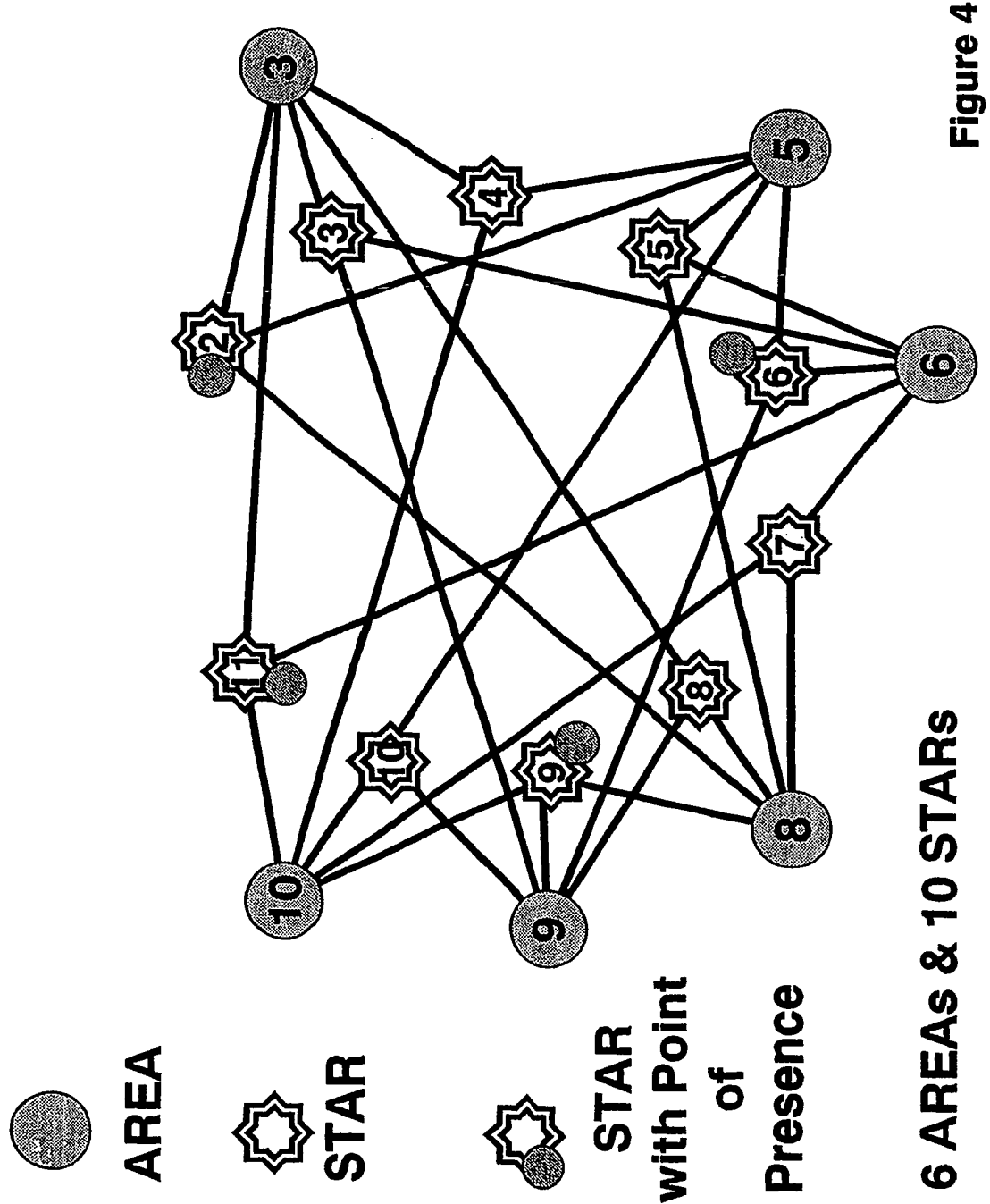
FIG. 4 shows the network of FIG. 2 when STAR 1 has been removed.

From an 11 AREA and 11 STAR arrangement it is possible to derive a 6 AREA and 10 STAR arrangement. This can be done by deleting STAR 1 and the 5 AREAs connected to it, namely AREAs 1, 2, 4, 7 and 11 to create a subset connectivity arrangement. The subset connectivity table for this arrangement is shown in FIG. 3b and FIG. 4 shows the 6 remaining AREAs and the 10 Remaining STARs, as well as the 4 remaining PoP Units, removing the PoP Unit at STAR 1.

The Subset network still offers 2 CHOICEs for traversing from one AREA to another AREA via a STAR, or for traversing from an Allocated Node in one AREA to an Allocated Node in another AREA. For the Subset network it is possible to directly reach two PoP Units from any AREA, or from an Allocated Node within any AREA. As the original AREA 1 has been deleted, the number of PoPs that can be reached directly is now the same from all AREAS.

If direct access to three STARs with PoP Units was required then, by attaching the PoP Units on the other 6 STARs, namely STARs 3, 4, 5, 7, 8 and 10 and not on STARs 1, 5, 8 and 10, this can be achieved.

FIG. 26 in patent application Ser. No. 2350517 has effectively the same connectivity. STARs 1, 2, 9 and 10 would have the 4 PoP Units so as to be able to access directly 2 PoP Units from any AREA, or from an Allocated Node within any AREA: STARs 3, 4, 5, 6, 7 and 8 would have the 6 Points of Presence, so as to be able to access directly 3 PoP Units from any AREA, or from an Allocated Node within any AREA The above arrangements works for any constant CHOICE pattern which has the number of AREAs equal to the Number of STARs and also for the derived subset patterns which do not have the number of AREAs equal to the number of STARs.

"The CRC Handbook of Combinatorial Design", C. J. Colbourn and J. H. Dinitz (Eds.), CRC Press, Boca Raton, Fla., 1966: lists Balanced Incomplete Block Designs which are Symmetric Designs (Table 5.7 on page 80) or Abelain Difference Sets (Table 12.4 page 301, using terms (v,k, $\lambda$) which are can be used to define constant CHOICE ($\lambda$) Partially Interconnected Networks with AREAs equal to STARs (v) and ROUTEs (k); which can have PoP Units attached to some of the STARs to give the characteristics described The converse of these Balanced Incomplete Block Designs (where each connection is replaced by a non-connection and each non-connection is replaced by a connection) can also be suitable.

The Balanced Incomplete Block Designs can also be used to derive the subset (residual) networks with the characteristics described.

However in some instances there are opportunities for having a regular Partially Interconnected Network with constant CHOICE, where the number of PoP Units that can be accessed is a constant, yet less than the number of CHOICEs.

This can be more easily explained by considering FIGS. 5a and 5b, which have the same characteristics as FIGS. 3a and 3b except that the initial table, which is shown in FIG. 5a, represents is a triple CHOICE network of 15 AREAs and 15 STARs with ROUTEs equal to 7.

PoP Units are attached to the STARs which are directly connected to AREA 1, namely STARs 1, 6, 8, 11, 12, 14 and 15. By attaching PoP Units at these 7 STARs then it is possible to directly reach three PoP Units from an AREA, or from an Allocated Node within a AREA, except for AREA 1, which as already stated is directly connected to all 7 PoP Units in this example.

From such an 15 AREA and 15 STAR arrangement it is possible to derive an 8 AREA and 14 STAR arrangement. This may be done by deleting STAR 1 and the 7 AREAs connected to it, namely AREAs 1, 2, 3, 5, 6, 9 and 11 to create a subset connectivity arrangement. The Subset connectivity table for this arrangement is shown in FIG. 5b.

For this subset each it is still possible to reach directly three PoP Units from an AREA, or from an Allocated Node within a AREA However the 6 PoP Units attached to the STARs can be considered as 3 Pairs, namely the pair 6 and 11; the pair 8 and 14; and the pair 12 and 15; using the original STAR numbering. This is because by attaching just 2 PoP Units at one of those pairs of STARs results in each of the 14 AREAs being directly connected to just one PoP Unit.

The invention claimed is:

1. A partially interconnected network, comprising: a plurality of allocated nodes, each allocated to one of a number of areas; a plurality of star nodes; and point-to-point interconnections between the allocated nodes and the star nodes; a part of the number of areas with the allocated nodes being interconnected to an individual star node to form a number of routes from an individual star node; some, but not all, of the plurality of star nodes having connected thereat one of a group of point of presence (PoP) units, said group of PoP units being arranged to provide access to a selected service or selected services; the allocated nodes of a first of the areas being interconnected to a set comprising some, but not all, of the star nodes; further of the areas being similarly interconnected to further sets each comprising star nodes; one, or more than one, of the direct point-to-point interconnections from each allocated node connecting to one, or more than one, of the plurality of star nodes having connected thereat one of the group of PoP units; at least one interconnection route being between any two allocated nodes in different areas; and the interconnection route comprising two of the point-to-point interconnections interconnected in series by a star node.

2. The partially interconnected network as claimed in claim 1, wherein further of the plurality of star nodes has connected thereat one of a further group of PoP units arranged to provide access to a further selected service or further selected services; and wherein one, or more than one, of the direct point-to-point interconnections from each allocated node connects to one, or more than one, of the plurality of star nodes having connected thereat one of the further group of PoP units.

3. The partially interconnected network as claimed in claim 1, wherein all of the allocated nodes are each directly connected via direct point-to-point interconnections to an equal number of star nodes having connected thereat one of a particular group of PoP units.

4. The partially interconnected network as claimed in claim 1, wherein all of the allocated nodes allocated to all the areas, except one area, are each directly connected via direct point-to-point interconnections to an equal number of star nodes having connected thereat one of a particular group of PoP units.

5. The partially interconnected network as claimed in claim 2, wherein at least one of the selected service, the selected services, the further selected service, and the further selected services is chosen from an internet service provider (ISP), a video source, a call center, an international network interconnection point, a further network interconnection point, or an intelligent network center, any of which is accessible with the help of intelligent network call control arrangements.

6. The partially interconnected network as claimed in claim 1, wherein there is an equal number of interconnection routes between any two allocated nodes in different areas, and an equal number of routes from each star node.

\* \* \* \* \*